(12) United States Patent
Wang et al.

(10) Patent No.: US 11,063,723 B2
(45) Date of Patent: Jul. 13, 2021

(54) COMMUNICATION METHOD, NETWORK DEVICE, TERMINAL DEVICE, AND SYSTEM

(71) Applicant: Huawei Technologies Co., Ltd., Shenzhen (CN)

(72) Inventors: Ting Wang, Shanghai (CN); Haibao Ren, Shanghai (CN); Shengyue Dou, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/716,347

(22) Filed: Dec. 16, 2019

(65) Prior Publication Data

US 2020/0119877 A1    Apr. 16, 2020

Related U.S. Application Data

(63) Continuation of application No. PCT/CN2018/089818, filed on Jun. 4, 2018.

(30) Foreign Application Priority Data

Jun. 16, 2017   (CN) .......................... 201710467064.6

(51) Int. Cl.
*H04L 5/00* (2006.01)

(52) U.S. Cl.
CPC .......... *H04L 5/0048* (2013.01); *H04L 5/0005* (2013.01); *H04L 5/0035* (2013.01)

(58) Field of Classification Search
CPC ... H04B 7/04; H04B 7/06; H04B 7/08; H04B 7/024; H04B 7/0404; H04B 7/0469;
(Continued)

(56) References Cited

U.S. PATENT DOCUMENTS

2015/0249973 A1   9/2015  Park et al.
2017/0006589 A1   1/2017  Park et al.
(Continued)

FOREIGN PATENT DOCUMENTS

CN        104685802 A      6/2015
CN        106664192 A      5/2017
(Continued)

OTHER PUBLICATIONS

"On QCL Framework and Configurations in NR," 3GPP TSG RAN WG1 NR Meeting, Athens, Greece, R1-1703184, pp. 1-3, 3rd Generation Partnership Project, Valbonne, France (Feb. 13-17, 2017).

*Primary Examiner* — Shawkat M Ali
(74) *Attorney, Agent, or Firm* — Leydig, Voit & Mayer, Ltd.

(57) ABSTRACT

This application provides a communication method, a network device, a terminal device, and a system. The communication method includes: determining, by a network device, a plurality of pieces of quasi co-location information, where the plurality of pieces of quasi co-location information correspond to a plurality of antenna port sets of a first control resource set, and each piece of quasi co-location information in the plurality of pieces of quasi co-location information is used to indicate a quasi co-location characteristic of an antenna port set corresponding to each piece of quasi co-location information; and sending, by the network device, the plurality of pieces of quasi co-location information to a terminal device. In embodiments of this application, the plurality of pieces of quasi co-location information are used to indicate the quasi co-location characteristics of the antenna ports to the terminal device, to improve communication efficiency.

20 Claims, 4 Drawing Sheets

(58) Field of Classification Search
CPC ......... H04L 5/00; H04L 5/001; H04L 5/0005;
H04L 5/0035; H04L 5/0048; H04L
5/0091; H04L 25/02; H04W 4/00; H04W
24/00; H04W 24/02; H04W 24/10; H04W
28/18; H04W 48/16; H04W 60/00; H04W
72/04; H04W 72/08; H04W 72/12; H04W
72/042; H04W 72/0446; H04W 76/15
USPC .................................. 370/329; 375/260, 267
See application file for complete search history.

(56) References Cited

U.S. PATENT DOCUMENTS

| | | |
|---|---|---|
| 2017/0202014 A1 | 7/2017 | Moon et al. |
| 2017/0331541 A1* | 11/2017 | Kang .................... H04L 5/0048 |
| 2018/0287681 A1 | 10/2018 | Chen et al. |
| 2020/0145079 A1* | 5/2020 | Marinier .............. H04B 7/0456 |
| 2020/0305151 A1* | 9/2020 | Shimezawa ....... H04W 72/0446 |

FOREIGN PATENT DOCUMENTS

| | | |
|---|---|---|
| WO | 2014112841 A1 | 7/2014 |
| WO | 2017026794 A1 | 2/2017 |
| WO | 2017050033 A1 | 3/2017 |

* cited by examiner

COMMUNICATION METHOD, NETWORK DEVICE, TERMINAL DEVICE, AND SYSTEM

CROSS-REFERENCE TO RELATED APPLICATIONS

This application is a continuation of International Application No. PCT/CN2018/089818, filed on Jun. 4, 2018, which claims priority to Chinese Patent Application No. 201710467064.6, filed on Jun. 16, 2017. The disclosures of the aforementioned applications are hereby incorporated by reference in their entireties.

TECHNICAL FIELD

Embodiments of this application relate to the communications field, and more specifically, to a communication method, a network device, a terminal device, and a system.

BACKGROUND

A definition of quasi co-location (Quasi Co-Located, QCL) is that a channel characteristic for a symbol sent by an antenna port may be derived from a channel characteristic for a symbol sent by another antenna port. A base station may indicate quasi co-location information of an antenna port to a terminal device, so that the terminal device obtains a channel characteristic (such as large-scale information) of a quasi co-located antenna port. The quasi co-location is widely used in a multiple-input multiple-output (Multiple Input Multiple Output, MIMO) system or a coordinated multipoint system.

The MIMO system may include a centralized MIMO system and a distributed MIMO system. A plurality of transmit antennas in the centralized MIMO system are centralized at a base station end. The distributed MIMO system is different from the centralized MIMO system. A plurality of transmit antennas in the distributed MIMO system may be distributed at different geographical locations, and each transmit antenna is more independent of a transmission/reception link. Therefore, antenna ports corresponding to different base stations or different transmission/reception points are non-quasi co-located, and antenna ports corresponding to a same base station may not be quasi co-located either because the antenna ports are at different geographical locations. Alternatively, a large-scale array structure of a plurality of antenna panels may be configured on a same transmission/reception point (TRP), and signals generated by different antenna panels correspond to different channel characteristics. In other words, the same transmission/reception point may also include non-quasi co-located transmit antennas. Therefore, in the MIMO system or the coordinated multipoint system, the terminal device may simultaneously receive physical downlink control channels (PDCCH) sent by a plurality of transmission/reception points or different antenna ports of one transmission/reception point that correspond to a control resource set. The transmission/reception points or different antenna ports of one transmission/reception point may have different quasi co-location characteristics, thereby increasing complexity of receiving the PDCCHs by the terminal device. Consequently, the terminal device cannot accurately perform channel estimation, thereby decreasing performance of receiving the control channels.

SUMMARY

This application provides a communication method, a network device, a terminal device, and a system, to improve communication efficiency.

According to a first aspect, a communication method is provided, including: determining, by a network device, a plurality of pieces of quasi co-location information, where the plurality of pieces of quasi co-location information correspond to a plurality of antenna port sets of a first control resource set, and each piece of quasi co-location information in the plurality of pieces of quasi co-location information is used to indicate a quasi co-location characteristic of an antenna port set corresponding to each piece of quasi co-location information; and sending, by the network device, the plurality of pieces of quasi co-location information to a terminal device.

In an embodiment of this application, a same control resource set may include two or more groups of antenna port sets. The network device sends the plurality of pieces of quasi co-location information to the terminal device, to indicate quasi co-location characteristics of different antenna port sets, so that the terminal device receives signals from the plurality of antenna port sets based on the plurality of pieces of quasi co-location information. In this way, efficiency that the terminal device receives the signals is improved, and communication efficiency is further improved.

Optionally, the network device may be a network device in a radio access network. For example, the network device may be a base station.

Optionally, the plurality of pieces of quasi co-location information may be carried in a same piece of signaling, or may be carried in different pieces of signaling. When the plurality of pieces of quasi co-location information are carried in the same piece of signaling, a quasi co-location information list may be used to indicate the quasi co-location characteristics of the plurality of antenna port sets. Alternatively, the plurality of pieces of quasi co-location information may be respectively used to indicate the quasi co-location characteristics of the plurality of antenna port sets.

In a possible implementation, the quasi co-location information indicates quasi co-location characteristics of the plurality of antenna port sets by using a pilot signal identifier or a pilot signal group identifier.

For example, a pilot signal may include a DMRS signal, and a pilot signal group may include a DMRS signal group.

In a possible implementation, the quasi co-location information indicates the quasi co-location characteristics of the plurality of antenna port sets by using a channel state information-reference signal CSI-RS resource identifier.

In a possible implementation, the first control resource set includes a plurality of resource sets, and the plurality of resource sets respectively correspond to the plurality of antenna port sets.

In this embodiment of this application, resources in the first control resource set are allocated based on different pieces of quasi co-location information, to avoid conflicts between a plurality of PDCCHs, and further reduce a quantity of blind detection times of the terminal device.

In a possible implementation, the plurality of resource sets are allocated according to at least one of the following granularities: a control channel element CCE, a physical control channel candidate, and a resource element group REG.

In a possible implementation, the method further includes: sending, by the network device, resource allocation indication information to the terminal device, where the resource allocation indication information is used to indicate allocation rule information of the plurality of resource sets included in the first control resource set.

In a possible implementation, the method further includes: sending, by the network device, resource element mapping indication information to the terminal device, where the resource element mapping indication information is used to indicate a location of a resource element of control information corresponding to a first antenna port set in the first control resource set, and the first antenna port set is any one of the plurality of antenna port sets.

In this embodiment of this application, one or more pieces of resource element mapping information may be sent, to obtain different pieces of resource element mapping information for antenna ports or antenna port sets corresponding to different pieces of quasi co-location information. In this way, channel estimation can be performed more accurately to obtain more accurate channel information, and a receiving capability of the terminal device can be improved.

Optionally, the network device may be a network device in a radio access network. For example, the network device may be a base station.

Optionally, the plurality of pieces of quasi co-location information may be carried in a same piece of signaling, or may be carried in different pieces of signaling. When the plurality of pieces of quasi co-location information are carried in the same piece of signaling, a quasi co-location information list may be used to indicate the quasi co-location characteristics of the plurality of antenna port sets. Alternatively, the plurality of pieces of quasi co-location information may be respectively used to indicate the quasi co-location characteristics of the plurality of antenna port sets.

In a possible implementation, the resource element mapping indication information includes information indicating a location of a pilot signal in the first control resource set.

Optionally, the method further includes: sending, by the network device, pilot state indication information to the terminal device, where the pilot state indication information is used to indicate a plurality of sequences and/or a plurality of patterns of pilot information, and the sequences and/or the patterns correspond to the antenna port set.

Optionally, the network device may further send, to the terminal device, a maximum quantity of pieces of quasi co-location information corresponding to the first control resource set.

According to a second aspect, a communication method is provided, including: receiving, by a terminal device, a plurality of pieces of quasi co-location information from a network device, where the plurality of pieces of quasi co-location information correspond to a plurality of antenna port sets of a first control resource set, and each piece of quasi co-location information in the plurality of pieces of quasi co-location information is used to indicate a quasi co-location characteristic of an antenna port set corresponding to each piece of quasi co-location information; and performing, by the terminal device, communication based on the plurality of pieces of quasi co-location information.

In an embodiment of this application, a same control resource set may include two or more groups of antenna port sets. The network device sends the plurality of pieces of quasi co-location information to the terminal device, to indicate quasi co-location characteristics of different antenna port sets, so that the terminal device receives signals from the plurality of antenna port sets based on the plurality of pieces of quasi co-location information. In this way, efficiency that the terminal device receives the signals is improved, and communication efficiency is further improved.

In a possible implementation, the quasi co-location information indicates quasi co-location characteristics of the plurality of antenna port sets by using a pilot signal identifier or a pilot signal group identifier.

In a possible implementation, the quasi co-location information indicates the quasi co-location characteristics of the plurality of antenna port sets by using a channel state information-reference signal CSI-RS resource identifier.

In a possible implementation, the first control resource set includes a plurality of resource sets, and the plurality of resource sets respectively correspond to the plurality of antenna port sets.

In a possible implementation, the plurality of resource sets are allocated according to at least one of the following granularities: a control channel element CCE, a physical control channel candidate, and a resource element group REG.

In a possible implementation, the method further includes: receiving, by the terminal device, resource allocation indication information from the network device, where the resource allocation indication information is used to indicate allocation rule information of the plurality of resource sets included in the first control resource.

In a possible implementation, the method further includes: receiving, by the terminal device, resource element mapping indication information from the network device, where the resource element mapping indication information is used to indicate a location of a resource element of control information corresponding to a first antenna port set in the first control resource set, and the first antenna port set is any one of the plurality of antenna port sets.

In a possible implementation, the resource mapping indication information includes information indicating a location of a pilot signal in the first control resource set.

Optionally, the method further includes: receiving, by the terminal device, pilot state indication information from the network device, where the pilot state indication information is used to indicate a plurality of sequences and/or a plurality of patterns of pilot information, and the sequences and/or the patterns correspond to the antenna port set.

Optionally, the terminal device may further receive, from the network device, a maximum quantity of pieces of quasi co-location information corresponding to the first control resource set.

In this embodiment of this application, a same control resource set may include two or more groups of antenna port sets. The network device sends the plurality of pieces of quasi co-location information to the terminal device, to indicate quasi co-location characteristics of different antenna port sets, so that the terminal device receives signals from the plurality of antenna port sets based on the plurality of pieces of quasi co-location information. In this way, efficiency that the terminal device receives the signals is improved, and communication efficiency is further improved.

According to a third aspect, a network device is provided. The network device is configured to perform the method according to the first aspect or any possible implementation of the first aspect. Specifically, the network device includes a unit configured to perform the method according to the first aspect or any possible implementation of the first aspect.

According to a fourth aspect, a terminal device is provided, and is configured to perform the method according to the second aspect or any possible implementation of the second aspect. Specifically, the terminal device includes a unit configured to perform the method according to the second aspect or any possible implementation of the second aspect.

According to a fifth aspect, a network system is provided. The system includes the network device in the third aspect and the terminal device in the fourth aspect.

According to a sixth aspect, a network device is provided. The network device includes: a communications interface, a memory, a processor, and a bus system. The communications interface, the memory, and the processor are connected by using the bus system. The memory is configured to store an instruction. The processor is configured to execute the instruction stored in the memory, to control the communications interface to receive and/or send a signal. In addition, when the processor executes the instruction stored in the memory, the processor can perform the method according to the first aspect or any possible implementation of the first aspect.

According to a seventh aspect, a terminal device is provided. The terminal device includes: a communications interface, a memory, a processor, and a bus system. The communications interface, the memory, and the processor are connected by using the bus system. The memory is configured to store an instruction. The processor is configured to execute the instruction stored in the memory, to control the communications interface to receive and/or send a signal. In addition, when the processor executes the instruction stored in the memory, the processor can perform the method according to the second aspect or any possible implementation of the second aspect.

According to an eighth aspect, a network system is provided. The system includes the network device in the sixth aspect and the terminal device in the seventh aspect.

According to a ninth aspect, a computer readable medium is provided, and is configured to store a computer program. The computer program includes an instruction used to perform the method according to the first aspect or any possible implementation of the first aspect.

According to a tenth aspect, a computer readable medium is provided, and is configured to store a computer program. The computer program includes an instruction used to perform the method according to the second aspect or any possible implementation of the second aspect.

DESCRIPTION OF EMBODIMENTS

Figure 1:
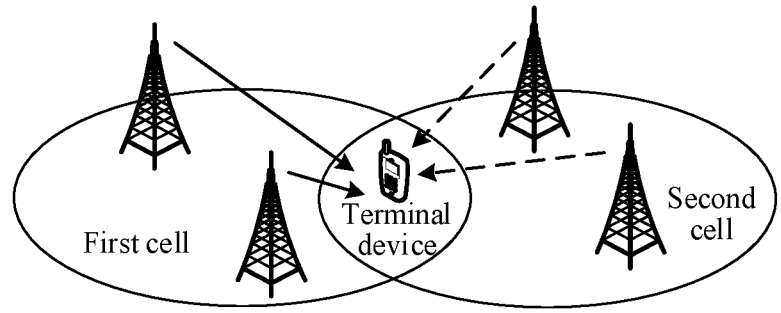
FIG. 1 is a schematic diagram of an application environment according to an embodiment of this application.

The following describes the technical solutions in this application with reference to the accompanying drawings.

For ease of understanding, some terms in the embodiments of this application are described first.

A definition of quasi co-location (Quasi Co-Located, QCL) is that if two antenna ports are quasi co-located, a channel characteristic for a symbol sent by an antenna port may be derived from a channel characteristic for a symbol sent by another antenna port.

A quasi co-location parameter of an antenna port may include but is not limited to at least one of the following: an average gain, an average delay, a delay spread, a Doppler shift, a Doppler spread, and a spatial reception parameter (spatial Rx parameters).

The spatial reception parameter may be expressed as a spatial channel characteristic that is of an antenna port and that is obtained at a receive end. Optionally, the spatial reception parameter may be further expressed as one or more of the following parameters: an angle of arrival (AoA), a dominant AoA, an average AoA, an angle of arrival spread (AAS), an angle of departure (AoD), an angle of departure spread (ADS), spatial correlation, power spectral density of an angle of arrival (Power Angular Spectrum of AoA, PAS of AoA), an average angle of departure (average AoD), power spectral density of an angle of departure (PAS of AoD), transmit/receive channel correlation, a transmit/receive beam (transmit/receive beam forming), and spatial channel correlation.

Optionally, a plurality of antenna ports corresponding to one base station may be quasi co-located, or may be non-quasi co-located. One base station may include one transmission/reception point (TRP), or may include a plurality of transmission/reception points. For example, in a distributed MIMO system, because antenna ports corresponding to a same base station are at different geographical locations, the same base station may include a plurality of transmission/reception points. Therefore, antenna ports of different transmission/reception points of the same base station may have different large-scale properties. In this case, the antenna ports corresponding to the different transmission/reception points of the same base station may also be non-quasi co-located.

Optionally, a large-scale array structure of a plurality of antenna panels may be configured on a same transmission/reception point, and different beams generated by different antenna panels correspond to different large-scale properties. Therefore, antenna ports of the same transmission/reception point may be quasi co-located, or may be non-quasi co-located.

Optionally, a plurality of antenna ports corresponding to different base stations may be non-quasi co-located.

Optionally, antenna ports that use different beams for sending and that are used in one transmission/reception point/base station may also be non-quasi co-located. A control resource set (CORESET) is a set of time-frequency resources used to transmit a control channel. The control resource set may include a time domain resource (for example, control channel symbol information) and/or a frequency domain resource (for example, a physical resource block RB occupied by a control channel).

A physical control channel candidate may also be referred to as a candidate for short. For one aggregation level, one PDCCH may be transmitted in a plurality of physical control channel candidates. The candidate resource may be related to the aggregation level. The aggregation level may be a quantity of CCEs for transmitting one PDCCH, or a quantity of CCE resources carrying one PDCCH.

Optionally, search space may include one or more PDCCH candidate resources. The search space may be a set of candidate resources at an aggregation level.

A control channel element (CCE) is a basic unit of a control channel resource. The CCE may include one or more resource element groups (REG).

A resource element group includes one or more resource elements Res. The RE is a basic resource unit. For example, in long term evolution (LTE), one RE is a subcarrier in frequency domain and a symbol in time domain.

A resource element is a minimum resource unit, for example, a symbol in time domain or a subcarrier in frequency domain in LTE.

A demodulation reference signal (DMRS) is a reference signal used to demodulate a signal.

A channel state information-reference signal (CSI-RS) is a reference signal used for channel measurement and/or channel estimation.

A synchronization signal (SS) is a signal used for time-frequency synchronization.

A transmission node (Transmission/Reception Point, TRP) may also be referred to as a transmission/reception point. In other words, the transmission node may be a device for performing communication. One base station may include one or more transmission/reception points. One transmission/reception point may include one or more panels.

The terminal device in embodiments of this application may include any type of handheld device, in-vehicle device, wearable device, or computing device that has a wireless communication function; another processing device connected to a wireless modem; or any type of user equipment (UE), mobile station (MS), terminal, terminal device, or the like.

In the embodiments of this application, the network device may include a device on a radio access network (RAN) side. For example, the network device may include any type of base station. For example, the base station may include any form of a macro base station, a micro base station, a relay node, an access point, a transmission/reception point, a transmission node, or the like. In systems that use different radio access technologies, devices with a base station function may have different names. For example, in an LTE network, a device that has a base station function is referred to as an evolved NodeB (eNB or eNodeB); in a 3rd generation (3G) network, a device that has a base station function is referred to as a NodeB; and the like. In a 5th generation (5G) network, a device that has a base station function may be referred to as a gNodeB (gNB), or a new radio (NR) base station.

The communication method provided in the embodiments of this application may be applied to a multipoint transmission system. The multipoint transmission system may indicate a scenario in which a plurality of transmission nodes simultaneously transmit data to a same terminal device, and may include a plurality of transmission systems.

Optionally, the multipoint transmission system may include a coordinated multipoint transmission (Coordinated Multiple Points Transmission/Reception, CoMP) system. The coordinated multipoint transmission system may mean that the plurality of transmission points at separated geographical locations jointly transmit data (for example, a physical downlink shared channel (PDSCH)) of one terminal device, or jointly receive data (for example, a physical uplink shared channel (PUSCH)) sent by one terminal device.

Optionally, the multipoint transmission system may further include a coordinated multipoint diversity transmission system. To be specific, an antenna distributed on two or more transmission nodes transmits a signal by using a space frequency block code (spatial frequency block coding, SFBC). For example, two manners may be used to perform coordinated transmission in the coordinated multipoint diversity transmission system. For example, in a first manner, it is assumed that each base station includes two transmit antennas, two base stations each may perform precoding to generate a transport stream, and the two transport streams of the two base stations are jointly used as a two-antenna space frequency block code. In a second manner, it is assumed that each base station includes two antennas, and a total of four antennas of the two base stations may be used as a four-antenna SFBC and a four-antenna frequency switched transmit diversity (FSTD).

Optionally, the multipoint transmission system may further include a coordinated multipoint multi-stream transmission system. To be specific, two or more transmission nodes independently perform precoding, and send different data streams to a same terminal device. Alternatively, different panels of a same transmission point send different data streams to the same terminal device. It should be noted that the technology is different from the CoMP system. In the joint transmission in the CoMP system, different transmission points transmit a same data stream.

Optionally, in an application scenario of the embodiments of this application, the CoMP system may be used as a background, and a MIMO technology is combined with coordinated multipoint transmission to form a distributed MIMO system.

Optionally, the application scenario of the embodiments of this application may include a MIMO system, for example, a distributed MIMO system.

Optionally, the application scenario of the embodiments of this application may also be applied to a single-cell transmission scenario. For example, one cell may include a plurality of beams or a plurality of antenna ports, and signals sent by different beams or different antenna ports are transmitted through different large-scale channels.

Optionally, the embodiments of this application are also applicable to a homogeneous network scenario or a heterogeneous network scenario.

Optionally, the transmission node is also not limited in the embodiments of this application. For example, the transmission node may include coordinated multipoint transmission between macro base stations, coordinated multipoint transmission between micro base stations, coordinated multipoint transmission between a macro base station and a micro base station, and coordinated transmission between different panels of a same base station. Different transmission nodes may be located in a same cell, or may be located in different cells.

Optionally, the communication method in the embodiments of this application is not only applicable to a frequency division duplex (FDD) system, but also applicable to a time division duplex (TDD) system and a flexible duplex system.

Optionally, the embodiments of this application are not only applicable to a low-frequency scenario (for example, lower than 6 GHz), but also applicable to a high-frequency scenario (for example, higher than 6 GHz).

With development of an NR technology, antenna ports corresponding to a control resource set allocated to the terminal device may have a non-quasi co-located antenna port. Therefore, a process in which the terminal device receives control information in the same control resource set is more complex. A central idea of the embodiments of this application is to provide a communication method for indicating quasi co-location information. In the communication method, a new quasi co-location indication manner is introduced for a case in which the same control resource set includes a plurality of quasi co-located antenna port sets. In this way, efficiency that the terminal device receives a signal is improved, and complexity that the terminal device receives a signal is reduced, thereby improving communication efficiency.

FIG. 1 is a possible application scenario according to an embodiment of this application. An application environment in FIG. 1 may be a typical coordinated multipoint transmission scenario. As shown in FIG. 1, data transmission may be simultaneously performed between a terminal device and base stations of a plurality of cells (for example, a first cell and a second cell). The terminal device may be located in one cell, or may be covered by a plurality of cells. A plurality of antenna ports included in the plurality of base stations that communicate with the terminal device may include a plurality of quasi co-located antenna ports, or may include a plurality of non-quasi co-located antenna ports.

Figure 2:
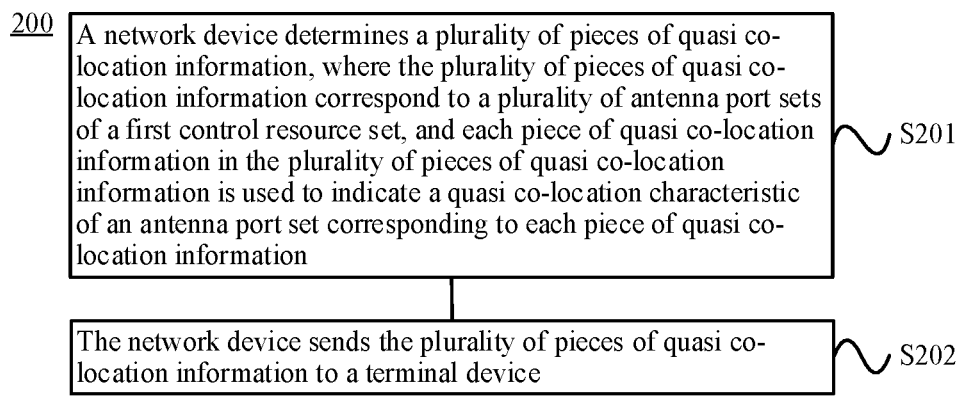
FIG. 2 is a schematic block diagram of a communication method according to an embodiment of this application.

FIG. 2 is a schematic flowchart of a communication method 200 according to an embodiment of this application. The method 200 includes the following steps.

S201. A network device determines a plurality of pieces of quasi co-location information, where the plurality of pieces of quasi co-location information correspond to a plurality of antenna port sets of a first control resource set, and each piece of quasi co-location information in the plurality of pieces of quasi co-location information is used to indicate a quasi co-location characteristic of an antenna port set corresponding to each piece of quasi co-location information.

Optionally, the network device may be a network device in a radio access network. For example, the network device may be a base station. It should be understood that the base station may include an antenna port in the plurality of antenna port sets, or may not include an antenna port in the plurality of antenna port sets. In other words, the base station may be configured to only send quasi co-location information to a terminal device, and may not participate in a service of control channel transmission with the same terminal device. Alternatively, the base station may not only be configured to send quasi co-location information to a terminal device, but also be configured to transmit a control channel to the same terminal device. This is not limited in this embodiment of this application.

Optionally, the quasi co-location characteristic may indicate that an antenna port set corresponding to the quasi co-location information is quasi co-located with which antenna port. For example, it is assumed that a first antenna port set includes an antenna port 1 and an antenna port 2, and the quasi co-location information may be used to indicate that the antenna port 1 and the antenna port 2 are quasi co-located with an antenna port corresponding to a CSI-RS 0.

For example, it is assumed that antenna ports included in a same transmission/reception point of the first control resource set are quasi co-located, and antenna ports included in different transmission/reception points are non-quasi co-located. In this case, the different transmission/reception points correspond to different pieces of quasi co-location information, and the same transmission/reception point may correspond to a same piece of quasi co-location information. The terminal device may receive PDCCHs sent by the antenna ports of the different transmission/reception points. A time-frequency resource occupied by the different transmission/reception points may be code division multiplexed, or may be frequency division multiplexed.

Optionally, the plurality of pieces of quasi co-location information include two or more pieces of quasi co-location information. The plurality of antenna port sets include two or more antenna port sets. Each antenna port set may include at least one antenna port.

Optionally, a same control resource set may include two or more groups of antenna port sets, and the antenna port sets may have a same quasi co-location characteristic, or may have different quasi co-location characteristics. The network device may send the plurality of pieces of quasi co-location information to the terminal device, to indicate quasi co-location characteristics of different antenna port sets, so that the terminal device receives signals from the plurality of antenna port sets based on the plurality of pieces of quasi co-location information.

Optionally, the plurality of pieces of quasi co-location information are in a correspondence with the plurality of antenna ports or the plurality of antenna port sets. The correspondence may be predefined, or may be indicated by using signaling. The signaling may be higher layer signaling, or may be physical layer signaling. The higher layer signaling may be radio resource control (RRC) signaling, a media access control (MAC) control element (CE), or other signaling. This is not specifically limited herein.

Optionally, the plurality of pieces of quasi co-location information may be in a one-to-one correspondence with the plurality of antenna ports or the plurality of antenna port sets. For example, if there are two pieces of quasi co-location information, and two antenna ports or two antenna port sets, for example, a first piece of quasi co-location information corresponds to a first antenna port or antenna port set, and a second piece of quasi co-location information corresponds to a second antenna port or antenna port set. Alternatively, the plurality of pieces of quasi co-location information may be in a one-to-many correspondence with the plurality of antenna ports or the plurality of antenna port sets. For example, if there are two pieces of quasi co-location information, and four antenna ports or four antenna port sets, a first piece of quasi co-location information corresponds to first and second antenna ports, or first and second antenna port sets; and a second piece of quasi co-location information corresponds to third and fourth antenna ports, or third and fourth antenna port sets. Alternatively, the plurality of pieces of quasi co-location information may be in a many-to-one correspondence with the plurality of antenna ports or the plurality of antenna port sets. For example, if there are four pieces of quasi co-location information, and two antenna ports or two antenna port sets, first and second pieces of quasi co-location information correspond to a first antenna port or antenna port set, and third and fourth pieces of quasi co-location information correspond to a second antenna port or antenna port set. Alternatively, the plurality of pieces of quasi co-location information may be in a many-to-many correspondence with the plurality of antenna ports or the plurality of antenna port sets. For example, if there are two pieces of quasi co-location information, and two antenna ports or two antenna port sets, first and second pieces of quasi co-location information correspond to a first antenna port or antenna port set, and the first and second pieces of quasi co-location information also correspond to a second antenna port or antenna port set. Alternatively, another correspondence is used. This is not limited herein. Optionally, a same terminal device may correspond to one or more control resource sets. Optionally, the first control resource set may include a set of time-frequency resources used to carry control information. For example, the first control resource set includes a physical downlink control channel resource set.

S202. The network device sends the plurality of pieces of quasi co-location information to the terminal device.

In this embodiment of this application, the same control resource set may include the two or more groups of antenna port sets. The network device sends the plurality of pieces of quasi co-location information to the terminal device, to indicate the quasi co-location characteristics of different antenna port sets, so that the terminal device receives the signals from the plurality of antenna port sets based on the plurality of pieces of quasi co-location information. In this way, efficiency that the terminal device receives the signals is improved, and communication efficiency is further improved.

Optionally, the plurality of pieces of quasi co-location information may be carried in a same piece of signaling, or may be carried in different pieces of signaling. When the plurality of pieces of quasi co-location information are carried in the same piece of signaling, a quasi co-location information list may be used to indicate the quasi co-location characteristics of the plurality of antenna port sets. Alternatively, the plurality of pieces of quasi co-location information may be respectively used to indicate the quasi co-location characteristics of the plurality of antenna port sets. This is not limited in this embodiment of this application.

Optionally, in the method 200, the network device may further send, to the terminal device, a maximum quantity that is of pieces of quasi co-location information and that corresponds to the first control resource set.

Optionally, in the method 200, the quasi co-location information may indicate the quasi co-location characteristics of the plurality of antenna port sets by using a pilot signal or a pilot signal group. For example, the pilot signal or the pilot signal group may include at least one of a DMRS identifier (DMRS port ID) or a DMRS group identifier (DMRS port group ID).

For example, DMRS group identifier information may be configured, and then quasi co-location information of an antenna port of a current DMRS is determined based on the DMRS group identifier information and quasi co-location information corresponding to the DMRS group identifier. Optionally, the quasi co-location characteristics of the plurality of antenna port sets may alternatively be indicated by using another indication method.

Optionally, a DMRS group may include one or more antenna ports. Quasi co-location information may be configured for each group of DMRS antenna ports or DMRS port IDs. For example, DMRS group information and corresponding quasi co-location information are configured by using higher layer signaling (for example, RRC signaling or a MAC CE). When a control resource set is configured, the DMRS group information and/or DMRS port ID, for example, the DMRS group identifier are/is indicated. In this case, the corresponding quasi co-location information may be determined by using the DMRS group information, and quasi co-location information of the DMRS antenna port of the control channel may be further determined. A channel characteristic of the DMRS antenna port may be known by using the quasi co-location information. Therefore, accuracy of DMRS channel estimation is improved, and accuracy of receiving the control channel is further improved, to improve performance.

For example, a quasi co-location information list may be used to indicate the quasi co-location information, and each quasi co-location information list may include one or more pieces of quasi co-location information.

Optionally, in the method 200, the quasi co-location information may indicate the quasi co-location characteristics of the plurality of antenna ports by using a CSI-RS resource identifier. The CSI-RS resource identifier is used to indicate a CSI-RS resource. One CSI-RS resource may include one or more CSI-RS antenna ports. The CSI-RS resource identifier may be indicated, to determine that the DMRS antenna port and a CSI-RS antenna port corresponding to the CSI-RS resource have a same piece of quasi co-location information. In other words, a channel characteristic of the DMRS antenna port may be known by using a channel characteristic of the CSI-RS antenna port. Therefore, accuracy of DMRS channel estimation is improved, and accuracy of receiving a control channel is further improved, to improve performance.

Optionally, in the method 200, the quasi co-location information may indicate the quasi co-location characteristics of the plurality of antenna ports by using a synchronization signal identifier. The synchronization signal identifier may be time domain information of a synchronization signal. For example, the time domain information of the synchronization signal is indicated, so that the terminal device can determine that the DMRS antenna port and an antenna port of the synchronization signal have a same quasi co-location characteristic. In other words, a channel characteristic of the DMRS antenna port may be known by using a channel characteristic of the synchronization signal. Therefore, accuracy of DMRS channel estimation is improved, and accuracy of receiving a control channel is further improved, to improve performance. Optionally, antenna ports of synchronization signals with different pieces of time domain information may have different quasi co-location characteristics.

Optionally, in the method 200, the first control resource set includes a plurality of resource sets, and the plurality of resource sets respectively correspond to the plurality of antenna port sets.

In this embodiment of this application, resources in the first control resource set may be divided, to avoid the following case: The terminal device detects all candidates, CCEs, or REGs for each antenna port to obtain a PDCCH. A division granularity may include but is not limited to at least one of the following: a physical control channel candidate(s), CCEs, or REGs. In other words, the first control resource set may include one or more physical control channel candidate sets, or sets of CCEs, or sets of REGs. One physical control channel candidate set includes one or more physical channel candidates, one set of CCEs includes one or more CCEs, and one set of REGs includes one or more REGs.

Alternatively, the terminal device may have one or more control resource set groups, and one control resource set group includes one or more control channel sets. One control resource set group may be considered as a resource set.

The antenna port set and/or the quasi co-location information are/is in a correspondence with the resource set. The correspondence may be predefined, or may be indicated by using signaling. The signaling may be higher layer signaling, or may be physical layer signaling. The higher layer signaling may be radio resource control (RRC) signaling, a media access control (MAC) control element (CE), or other signaling. This is not specifically limited herein.

For example, the antenna port or antenna port set and/or the quasi co-location information are/is in a one-to-one correspondence with the resource set. For example, if there are two groups of antenna ports or two groups of antenna port sets, and two resource sets, a first group of antenna ports or a first group of antenna port sets corresponds to a first resource set, and a second group of antenna ports or a second group of antenna port sets corresponds to a second resource set. If there are two pieces of quasi co-location information and two resource sets, a first piece of quasi co-location information corresponds to a first resource set, and a second piece of quasi co-location information corresponds to a second resource set. Alternatively, the antenna port or antenna port set and/or the quasi co-location information are/is in a one-to-many correspondence with the resource set. For example, if there are two groups of antenna ports or two groups of antenna port sets, and four resource sets, a first group of antenna ports or a first group of antenna port sets corresponds to a first resource set and a second resource set, and a second group of antenna ports or a second group of antenna port sets corresponds to a third resource set and a fourth resource set. Alternatively, a first group of antenna ports or a first group of antenna port sets corresponds to a first resource set and a third resource set, and a second group of antenna ports or a second group of antenna port sets corresponds to a second resource set and a fourth resource set. Alternatively, a first group of antenna ports or a first group of antenna port sets corresponds to a first resource set and a fourth resource set, and a second group of antenna ports or a second group of antenna port sets corresponds to a second resource set and a third resource set. If there are two pieces of quasi co-location information and four resource sets, a first piece of quasi co-location information corresponds to a first resource set and a second resource set, and a second piece of quasi co-location information corresponds to a third resource set and a fourth resource set. Alternatively, the antenna port or antenna port set and/or the quasi co-location information are/is in a many-to-many correspondence with the resource set. If there are four pieces of quasi co-location information and four resource sets, a first piece of quasi co-location information and a second piece of quasi co-location information correspond to a first resource set and a second resource set, and a third piece of quasi co-location information and a fourth piece of quasi co-location information correspond to a third resource set and a fourth resource set. Alternatively, another correspondence may be used. This is not specifically limited herein.

Optionally, the antenna port set and/or the quasi co-location information are/is in a correspondence with the candidate/CCEs/REGs. Specifically, the correspondence between the candidate/CCEs/REGs and each of or both of the antenna port set and the quasi co-location information is similar to a correspondence between the resource set and each of or both of the antenna port set and the quasi co-location information. Details are not described herein again.

The correspondence between the candidate/CCEs/REGs and each of the antenna port set and the quasi co-location information may be predefined, or may be indicated by using signaling. The signaling may be higher layer signaling, or may be physical layer signaling. The higher layer signaling may be radio resource control (RRC) signaling, a media access control (MAC) control element (CE), or other signaling. This is not specifically limited herein.

The resources in the first control resource set are in a correspondence with the antenna port set or the quasi co-location information. Therefore, when performing blind detection on a PDCCH, the terminal device may perform blind detection in a resource set corresponding to an antenna port set or quasi co-location information. After detecting the PDCCH in the resource set, the terminal device may not need to check remaining resources in the resource set, and instead, the terminal device may check a next resource set, to reduce a quantity of blind detection times and improve blind detection efficiency.

Some or all of the resources in the first control resource set are divided into a plurality of resource sets, to avoid conflicts between a plurality of PDCCHs and reduce the quantity of blind detection times of the terminal device.

Optionally, the method 200 further includes: sending, by the network device, resource allocation indication information to the terminal device, where the resource allocation indication information is used to indicate allocation rule information of a plurality of resource sets included in the first control resource set.

In this embodiment of this application, a plurality of pieces of quasi co-location information may be configured, to obtain different channel characteristics (for example, a large-scale property) for different antenna ports or different antenna port sets. In this way, channel estimation can be performed more accurately to obtain more accurate channel information, and a receiving capability of the terminal device can be improved.

In this embodiment of this application, the resources in the first control resource set are allocated based on different pieces of quasi co-location information, to avoid conflicts between a plurality of PDCCHs and further reduce a quantity of blind detection times of the terminal device.

Optionally, the method 200 further includes: sending, by the network device, resource element mapping indication information to the terminal device, where the resource element mapping indication information is used to indicate a location of a resource element of control information corresponding to a first antenna port set in the first control resource set, and the first antenna port set is any one of the plurality of antenna port sets.

In this embodiment of this application, one or more pieces of resource element mapping information may be sent, to obtain different pieces of resource element mapping information for antenna ports or antenna port sets corresponding to different pieces of quasi co-location information. In this way, channel estimation can be performed more accurately to obtain more accurate channel information, and a receiving capability of the terminal device can be improved.

For example, the pilot signal may include a DMRS signal, and the control information may include a PDCCH.

For example, the base station may send resource element mapping indication information to the terminal device, where the resource element mapping indication information is used to indicate a location of a resource element that is in the first control resource set and that is of control information corresponding to a group of antenna ports in the first control resource set. Optionally, there may be a plurality of pieces of resource element mapping indication information, and the plurality of pieces of resource element mapping indication information may be in a correspondence with the plurality of pieces of quasi co-location information. For example, the correspondence may be a one-to-one correspondence. For example, a first piece of resource element mapping indication information corresponds to a first piece of quasi co-location information. Alternatively, the correspondence is a one-to-many correspondence. For example, if there are two pieces of resource element mapping indication information and four pieces of quasi co-location information, a first piece of resource element mapping indication information may correspond to first and second pieces of quasi co-location information, and a second piece of resource element mapping indication information may correspond to third and fourth pieces of quasi co-location information. Alternatively, the correspondence may be a many-to-one correspondence. For example, if there are four pieces of resource element mapping indication information and two pieces of quasi co-location information, first and second pieces of resource element mapping indication information may correspond to a first piece of quasi co-location information, and third and fourth pieces of resource element mapping indication information correspond to a second piece of quasi co-location information. Alternatively, the correspondence may be a many-to-many correspondence. For example, if there are two pieces of resource element mapping indication information and two pieces of quasi co-location information, first and second pieces of resource element mapping indication information may correspond to a first piece of quasi co-location information, and first and second pieces of resource element mapping indication information may correspond to a second piece of quasi co-location information. Alternatively, the correspondence may be another correspondence. This is not limited herein again. The correspondence may be predefined, or may be indicated by using signaling. The signaling may be higher layer signaling, or may be physical layer signaling. The higher layer signaling may be radio resource control (RRC) signaling, a media access control (MAC) control element (CE), or other signaling. This is not specifically limited herein.

After receiving the resource element mapping indication information, the terminal device may determine, based on the quasi co-location information corresponding to the resource element mapping indication information, a resource set corresponding to the resource element mapping indication information, and further determine a location of the pilot signal in the resource set or determine the location of the resource element of the control information.

Optionally, the resource element mapping indication information includes information indicating the location of the pilot signal in the first control resource set. The location of the pilot signal in the first control resource set may include the location of the resource element of the pilot signal in the first control resource set. The location occupied by the control information does not overlap with the location occupied by the pilot signal. Therefore the location of the resource element of the pilot signal in the first control resource set may be used to indicate the location of a resource element of the control information in the first control resource set.

The resource element mapping indication information may be configured, to indicate locations of pilots of other transmission points or different antenna port groups of a same transmission point. In this way, interference between the pilots of the transmission points or interference between the pilots of the different antenna port groups of the same transmission point can be reduced, and accuracy of channel estimation of the antenna port group can be improved, to further improve performance of receiving the control channel. For example, a transmission point 2 does not send a signal at a location of a resource element for sending a pilot of a transmission point 1, and the transmission point 1 does not send a signal at a location of a resource element for sending a pilot of the transmission point 2. In this way, no signal interference exists between pilots of transmission points, to improve accuracy of channel estimation performed by the terminal device based on the pilot, and improve performance of receiving the control channel. Alternatively, for example, an antenna port group 2 of a transmission point 1 does not send a signal at a location of a resource element for sending a pilot of an antenna port group 1 of a transmission point 1, and the antenna port group 1 of the transmission point 1 does not send a signal at a location of a resource element for sending a pilot of an antenna port group 2 of the transmission point 1. In this way, no signal interference exists between pilots of the different antenna port groups of the same transmission point, to improve accuracy of channel estimation performed by the terminal device based on the pilot and improve performance of receiving the control channel.

Optionally, the method 200 further includes: sending, by the network device, pilot state indication information to the terminal device, where the pilot state indication information is used to indicate a plurality of sequences and/or a plurality of patterns of pilot information, and the sequences and/or the patterns correspond to the antenna port set.

Optionally, one or more antenna ports or antenna port sets are configured for one control channel resource set, each antenna port or antenna port set corresponds to one sequence, and the one or more sequences may be different sequences or may be different scrambling codes or orthogonal codes of a same sequence. In this case, sequences of different antenna ports or antenna port sets are orthogonal. In this way, interference between pilot sequences of different antenna ports or antenna port sets can be reduced, and performance of receiving the control channel can be improved. Orthogonality between signals can be ensured by using different sequences. In this case, optionally, one or more patterns may be further configured. If a plurality of patterns are configured, the plurality of patterns are in a correspondence with a plurality of sequences. For example, the correspondence is a one-to-one correspondence.

Optionally, one or more antenna ports or antenna port sets are configured for one control channel resource set, and one or more antenna ports or antenna port sets correspond to one sequence. In this case, a plurality of patterns need to be configured, to ensure orthogonality between signals of different antenna ports or antenna port sets. For example, one antenna port or antenna port set corresponds to one pattern. In this case, different antenna ports or different antenna port sets may occupy different time-frequency resources by using the plurality of patterns, to send signals, thereby avoiding interference between pilot sequences of the antenna port or antenna port set and improving performance of receiving a control channel.

Figure 3:
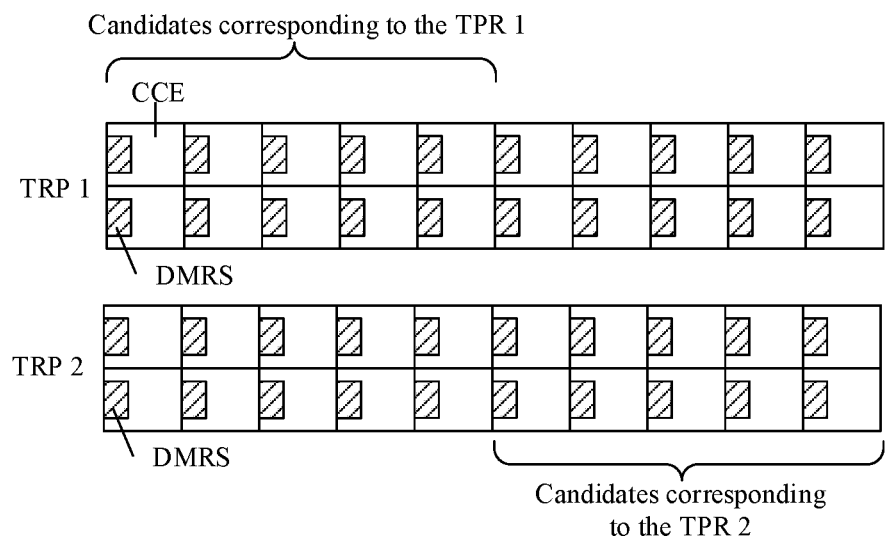
FIG. 3 is a schematic diagram of a method for allocating a plurality of resource sets in a code division multiplexing case according to an embodiment of this application.

FIG. 3 shows an example of a method for allocating a plurality of resource sets included in a first control resource set in a code division multiplexing case. As shown in the figure, it is assumed that the first control resource set includes two groups of antenna port sets. A first antenna port set corresponds to a first transmission/reception point (TRP1), and a second antenna port set corresponds to a second transmission/reception point (TRP2). A time-frequency resource occupied by the first transmission/reception point and the second transmission/reception point is code division multiplexed. Due to code division multiplexing, as shown in FIG. 3, a PDCCH sent by the first transmission/reception point and a PDCCH sent by the second transmission/reception point occupy time-frequency resources at a same location. In other words, pilot signals (for example, DMRSs) of the first transmission/reception point and the second transmission/reception point occupy the time-frequency resources at overlapped locations. Certainly, a specific pilot pattern is not limited in this embodiment of this application. A pilot pattern in LTE may be used, and a pilot pattern in NR may also be used.

In FIG. 3, two pilot sequences may be correspondingly configured for two groups of antenna ports or two groups of antenna port sets in a first control set, and the two pilot sequences may be different sequences or may be different scrambling codes or OCCs of a same sequence. When different transmission/reception points have different quasi co-location characteristics, different pieces of quasi co-location information need to be configured for antenna ports or antenna port sets of different transmission/reception points, to distinguish between different quasi co-location characteristics.

Still referring to FIG. 3, in this embodiment of this application, resources in a first control resource set may be divided, to avoid the following case: The terminal device detects all candidates, or CCEs, or REGs for each antenna port to obtain a PDCCH. A division granularity may include but is not limited to at least one of the following: a candidate(s), CCEs, or REGs. A specific division granularity may be predefined, or may be notified by using signaling. The signaling may be higher layer signaling, or may be physical layer signaling. The higher layer signaling may be radio resource control (RRC) signaling, a media access control (MAC) control element (CE), or other signaling. This is not specifically limited herein.

For example, in FIG. 3, the first control resource set may be divided half-and-half. A resource allocation granularity is a candidate(s).

For example, the first antenna port set may correspond to half candidates/CCEs/REGs, and the second antenna port set may correspond to the other half candidates/CCEs/REGs.

A resource allocation rule for the first control resource set is not limited in this embodiment of this application. For example, when the first control resource set corresponds to antenna port sets with two quasi co-location characteristics, a principle such as half-and-half division, cross division, or parity division may be used.

The resources in the first control resource set are correspondingly allocated to different antenna port sets. Therefore, when performing blind detection on a PDCCH, the terminal device may perform blind detection in a resource set corresponding to an antenna port set. After detecting the PDCCH in the resource set, the terminal device may not need to check remaining resources in the resource set, and instead, the terminal device may check a next resource set, to reduce a quantity of blind detection times and improve blind detection efficiency.

In this embodiment of this application, a plurality of pieces of quasi co-location information may be configured, to obtain different channel characteristics (for example, a large-scale property) for different antenna ports or different antenna port sets. In this way, channel estimation can be performed more accurately to obtain more accurate channel information, and a receiving capability of the terminal device can be improved.

In this embodiment of this application, the resources in the first control resource set are allocated based on different pieces of quasi co-location information, or the first control resource set includes a plurality of resource sets, to avoid conflicts between a plurality of PDCCHs and further reduce a quantity of blind detection times of the terminal device.

Figure 4:
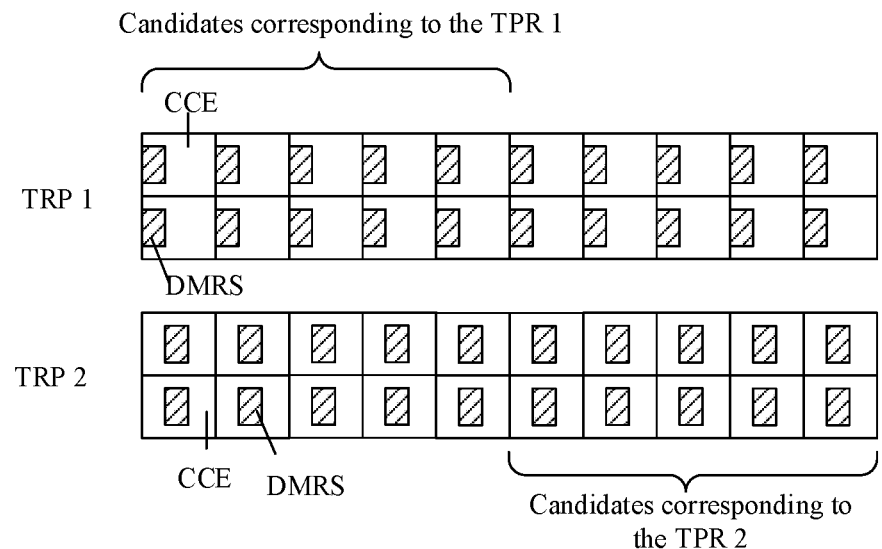
FIG. 4 is a schematic diagram of a method for allocating a plurality of resource sets in a frequency division multiplexing case according to an embodiment of this application.

FIG. 4 shows an example of a method for allocating a plurality of resource sets included in a first control resource set in a frequency division multiplexing case. As shown in the figure, it is assumed that the first control resource set includes two groups of antenna port sets. A first antenna port set corresponds to a first transmission/reception point (TRP1), and a second antenna port set corresponds to a second transmission/reception point (TRP2). A time-frequency resource occupied by the first transmission/reception point and the second transmission/reception point is frequency division multiplexed. Due to frequency division multiplexing, as shown in FIG. 4, a PDCCH sent by the first transmission/reception point and a PDCCH sent by the second transmission/reception point occupy time-frequency resources at different locations. In other words, pilot signals (for example, DMRSs) of the first transmission/reception point and the second transmission/reception point occupy the time-frequency resources at overlapped locations. Certainly, a specific pilot pattern is not limited in this embodiment of this application. A pilot pattern in LTE may be used, and a pilot pattern in NR may also be used.

In FIG. 4, two pilot (for example, DMRS) sequences may be correspondingly configured for two groups of antenna port sets in the first control set, and the two pilot sequences may be different sequences or may be different scrambling codes or OCCs in a same sequence. When different transmission/reception points have different quasi co-location characteristics, different pieces of quasi co-location information need to be configured for different transmission/reception points, to distinguish between different quasi co-location characteristics.

Still referring to FIG. 4, in this embodiment of this application, resources in the first control resource set may be divided, to avoid the following case: The terminal device detects all candidates, or CCEs, or REGs for each antenna port to obtain a PDCCH. A division granularity may include but is not limited to at least one of the following: a candidate (candidates), CCEs, or REGs. For example, in FIG. 4, the first control resource set may be divided half-and-half A resource allocation granularity is a candidate(s).

For example, the first antenna port set may correspond to half candidates/CCEs/REGs, and the second antenna port set may correspond to the other half candidates/CCEs/REGs.

A resource allocation rule for the first control resource set is not limited in this embodiment of this application. For example, when the first control resource set corresponds to antenna port sets with two quasi co-location characteristics, a principle such as half-and-half division, cross division, or parity division may be used.

The resources in the first control resource set are correspondingly allocated to different antenna port sets. Therefore, when performing blind detection on a PDCCH, the terminal device may perform blind detection in a resource set corresponding to an antenna port set. After detecting the PDCCH in the resource set, the terminal device may not need to check remaining resources in the resource set, and instead, the terminal device may check a next resource set, to reduce a quantity of blind detection times and improve blind detection efficiency.

In this embodiment of this application, a plurality of pieces of quasi co-location information may be configured, to obtain different channel characteristics (for example, a large-scale property) for different antenna ports or different antenna port sets. In this way, channel estimation can be performed more accurately to obtain more accurate channel information, and a receiving capability of the terminal device can be improved.

In this embodiment of this application, the resources in the first control resource set are allocated based on different pieces of quasi co-location information, to avoid conflicts between a plurality of PDCCHs and further reduce a quantity of blind detection times of the terminal device.

In a specific example, FIG. 3 is a schematic diagram of xx according to an embodiment of this application. It is assumed that a terminal device receives a plurality of PDCCHs from a plurality of beams or a plurality of antenna ports of one or more transmission/reception points. The plurality of PDCCHs are located in a same control resource set, and antenna ports corresponding to base stations (it is assumed that there are two base stations) that send the PDCCHs are non-quasi co-located.

Still referring to FIG. 4, the following describes in detail an allocation rule of resource sets in this embodiment of this application. The specific allocation rule may be predefined, or may be notified by using signaling. The signaling may be higher layer signaling, or may be physical layer signaling. The higher layer signaling may be radio resource control (RRC) signaling, a media access control (MAC) control element (CE), or other signaling. This is not specifically limited herein.

As shown in FIG. 4, that the first control resource set corresponds to two pieces of quasi co-location information is used as an example. The entire first control resource set may be divided into two parts or two resource sets, for example, a first part of time-frequency resources or CCEs and the other part of time-frequency resources or CCEs.

Optionally, the resource set may be divided based on an actual time-frequency resource or based on a virtual time-frequency resource, for example, a resource after REG numbering or CCE numbering. For example, the first part of time-frequency resources may be the actual time-frequency resource, or may be the time-frequency resource after REG numbering or CCE numbering. For example, if there are two symbols in total, a first symbol is a first resource set, and a second symbol is a second resource set; or if there are X RB resources in total, first X/2 RBs are a first resource set, and the other X/2 RBs are a second resource set; or if there are N REGs in total, first N/2 REGs are a first resource set, and the other N/2 REGs are a second resource set. Alternatively, it is assumed that there are M CCEs in total. First M/2 CCEs are a first resource set, and the other M/2 CCEs are a second resource set.

For example, the CCE may include a plurality of REGs on one symbol, or may include a plurality of REGs on a plurality of symbols. Alternatively, another mapping manner may exist between the CCE and the REGs, for example, interleaving. This is not limited in this embodiment of this application.

For another example, division based on a candidate(s) is used as an example. Each candidate may include one or more CCEs. In this case, the candidates may be divided into a plurality of resource sets. For example, there may be a plurality of candidates for an aggregation level, and the plurality of candidates may be divided into a plurality of sets. Specifically, for example, when an aggregation level is 8, if there are two candidates that are divided into two sets, a first candidate may be a first resource set, and a second candidate may be a second resource set. For example, when an aggregation level is 4, if there are four candidates that are divided into two sets, first two candidates are a first resource set, and the other two candidates are a second resource set; or candidates with odd numbers are a first resource set, and candidates with even numbers are a second resource set; or a first candidate and a fourth candidate are a first resource set, and a second candidate and a third candidate are a second resource set. In FIG. 4, because antenna ports or antenna port sets are divided based on a transmission/reception point. To be specific, antenna ports or antenna port sets included in each transmission/reception point are quasi co-located. Therefore, each transmission/reception point or each piece of quasi co-location information may correspond to some candidates.

For another example, division is performed based on REGs. Division may be performed based on a REG bundle pattern. For example, it is assumed that the first control resource set corresponds to at least two pieces of quasi co-location information. A quasi co-location characteristic of the antenna port in the first control resource set may be correspondingly determined based on the REG bundle pattern. For example, if there are two types of REG bundle patterns and two pieces of quasi co-location information, a first type of REG bundle pattern corresponds to one piece of quasi co-location information, and a second type of REG bundle pattern corresponds to the other piece of quasi co-location information. For example, if there are four types of REG bundle patterns and two pieces of quasi co-location information, a first type of REG bundle pattern and a second type of REG bundle pattern correspond to one piece of quasi co-location information, and a third type of REG bundle pattern and the third type of REG bundle pattern correspond to the other piece of quasi co-location information. If there are four types of REG bundle patterns and four pieces of quasi co-location information, the four types of REG bundle patterns may be sequentially in a one-to-one correspondence with the four pieces of quasi co-location information.

Optionally, the correspondence between the candidate/CCEs/REGs and each antenna port or each antenna port set or each piece of quasi co-location information may be predefined, or may be indicated by using signaling. The signaling may be higher layer signaling, or may be physical layer signaling. The higher layer signaling may be radio resource control (RRC) signaling, a media access control (MAC) control element (CE), or other signaling. This is not specifically limited herein.

The following further describes a configuration manner of the quasi co-location information in this embodiment of this application. Optionally, the plurality of pieces of quasi co-location information may be carried in different pieces of signaling, or may be carried in a same piece of signaling. The signaling may further include an identifier (CORESET-Setconfig) of the first control resource set, to indicate that the signaling is configuration information corresponding to the first control resource set. Optionally, the signaling may further include resource allocation rule (Assignment rule) information in the first control resource set. The allocation rule may be, for example, half-and-half division, parity division, or cross division. Alternatively, the information may indicate a granularity corresponding to the allocation rule. The corresponding granularity may include a candidate, CCEs, or REGs. The resource allocation rule information is optional, and the information may exist or may not exist. Alternatively, resource division granularity information is optional, and the information may exist or may not exist. Alternatively, the resource allocation rule information and/or the resource division granularity information may be located in a same piece of signaling with the quasi co-location information, or may be located in a different piece of signaling from the quasi co-location information. Further, a maximum quantity (maxDMRS group ID) of pieces of quasi co-location information for the first control resource set may also be indicated in signaling.

Optionally, for the quasi co-location information, a quasi co-location information list (QCL-configIdList) may be used to indicate the quasi co-location information of each antenna port or antenna port set. Alternatively, a plurality of pieces of quasi co-location information (QCL-configId) may be used to indicate the quasi co-location information of each antenna port or antenna port set. For example, QCL-configId 1, QCL-configId 2, and the like may be configured.

Optionally, a CSI-RS resource ID may be used to indicate the quasi co-location information, or a pilot signal identifier or a pilot signal group identifier may be used to indicate the quasi co-location information. The pilot signal identifier may be a DMRS port identifier, and the pilot signal group identifier may be a DMRS port group identifier.

Optionally, synchronization signal information may be used to indicate the quasi co-location information, or beam-related information may be used to indicate the quasi co-location information, for example, beam link information, beam pair information, a beam identifier, or other beam-related information.

The following describes a rate matching solution, or a resource element mapping solution in this embodiment of this application. According to the communication method 200 in this embodiment of this application, antenna ports or antenna port sets corresponding to different base stations or different pieces of quasi co-location information send pilot signals at different locations. In this case, there may be different solutions for whether a resource location at which a pilot of another base station or antenna port is located is bypassed when a base station or an antenna port sends control information. The pilot may be a DMRS signal.

In a first solution, for example, antenna ports included in a same base station are quasi co-located, and antenna ports included in different base stations are non-quasi co-located. Different base stations may be selected to skip bypassing a pilot resource location of each other. For example, a first base station may send control information at a location at which a second base station sends a pilot. In this solution, there are many REs available on the control channel, to reduce a bit rate of the control channel and improve transmission performance.

In a second solution, for example, antenna ports included in a same base station are quasi co-located, and antenna ports included in different base stations are non-quasi co-located. Different base stations may be selected to bypass a pilot resource location of each other. For example, a first base station may not send control information at a location at which a second base station sends a pilot signal, and the second base station may not send control information at a location at which the first base station sends a pilot signal. In this solution, there is no interference between locations of pilot signals of base stations, to improve channel estimation performance and further improve transmission performance.

Optionally, in the second solution, the terminal device may not need to know the location of the pilot signal, or the terminal device may not need to know a time-frequency resource location that cannot be occupied by the control information; and the base station performs a puncturing operation.

Optionally, in the second solution, the terminal device may also know the location of the pilot signal, or the terminal device may know a time-frequency resource location that can be specifically occupied by the control information, so that the terminal device determines specific rate matching information and further receives the control information.

For example, the base station may send resource element mapping indication information to the terminal device, where the resource element mapping indication information is used to indicate a location that is in the first control resource set and that is of control information corresponding to an antenna port in the first control resource set. Optionally, there may be a plurality of pieces of resource allocation information, and the plurality of pieces of resource allocation indication information may be in a correspondence with a plurality of pieces of quasi co-location information. The correspondence may be predefined, or may be indicated by using signaling. After receiving the resource element mapping indication information, the terminal device may determine, based on quasi co-location information corresponding to the resource element mapping indication information, a resource set corresponding to the resource element mapping indication information, and further determine a location of a pilot signal in the resource set or determine a location of a time-frequency resource of the control information.

Optionally, there may be a plurality of pieces of resource allocation information, and the plurality of pieces of resource allocation indication information may be in a correspondence with a plurality of antenna ports or a plurality of antenna port sets. The correspondence may be predefined, or may be indicated by using signaling. After receiving the resource element mapping indication information, the terminal device may determine, based on an antenna port or antenna port set corresponding to the resource element mapping indication information, a resource set corresponding to the resource element mapping indication information, and further determine a location of a pilot signal in the resource set or determine a location of a time-frequency resource of the control information.

In this embodiment of this application, one or more pieces of resource allocation indication information may be sent, to obtain different pieces of resource element mapping information for antenna ports or antenna port sets corresponding to different pieces of quasi co-location information. In this way, channel estimation can be performed more accurately to obtain more accurate channel information, and a receiving capability of the terminal device can be improved.

The communication method in the embodiments of this application is described above with reference to FIG. 1 to FIG. 4. An apparatus in the embodiments of this application is described below with reference to FIG. 5 to FIG. 10.

Figure 5:
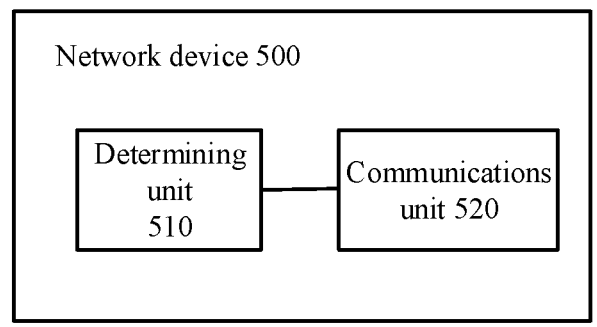
FIG. 5 is a schematic block diagram of a network device according to an embodiment of this application.

FIG. 5 is a schematic block diagram of a network device 500 according to an embodiment of this application. It should be understood that the network device 500 can perform steps performed by the network device in the methods in FIG. 1 to FIG. 4. To avoid repetition, details are not described herein again. The network device may include various types of base stations, such as a gNB, an NR base station, a macro base station, and a micro base station. The network device 500 includes:

a determining unit 510, configured to determine a plurality of pieces of quasi co-location information, where the plurality of pieces of quasi co-location information correspond to a plurality of antenna port sets of a first control resource set, and each piece of quasi co-location information in the plurality of pieces of quasi co-location information is used to indicate a quasi co-location characteristic of an antenna port set corresponding to each piece of quasi co-location information; and a communications unit 520, configured to send the plurality of pieces of quasi co-location information to a terminal device.

Figure 6:
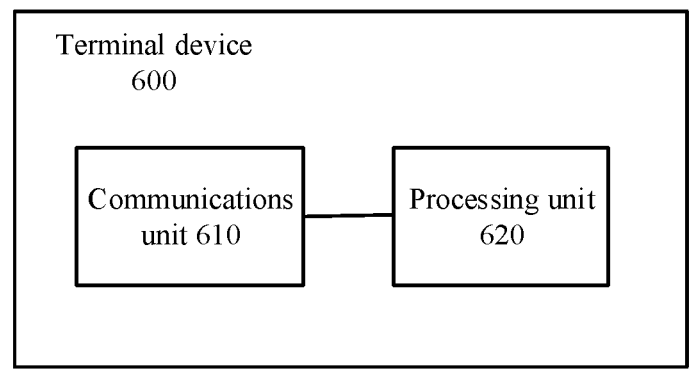
FIG. 6 is a schematic block diagram of a terminal device according to an embodiment of this application.

FIG. 6 is a schematic block diagram of a terminal device 600 according to an embodiment of this application. It should be understood that the terminal device 600 can perform steps performed by the terminal device in the methods in FIG. 1 to FIG. 4. To avoid repetition, details are not described herein again. The terminal device 600 includes:

a communications unit 610, configured to receive a plurality of pieces of quasi co-location information from a network device, where the plurality of pieces of quasi co-location information correspond to a plurality of antenna port sets of a first control resource set, and each piece of quasi co-location information in the plurality of pieces of quasi co-location information is used to indicate a quasi co-location characteristic of an antenna port set corresponding to each piece of quasi co-location information; and a processing unit 620, configured to perform communication based on the plurality of pieces of quasi co-location information.

Figure 7:
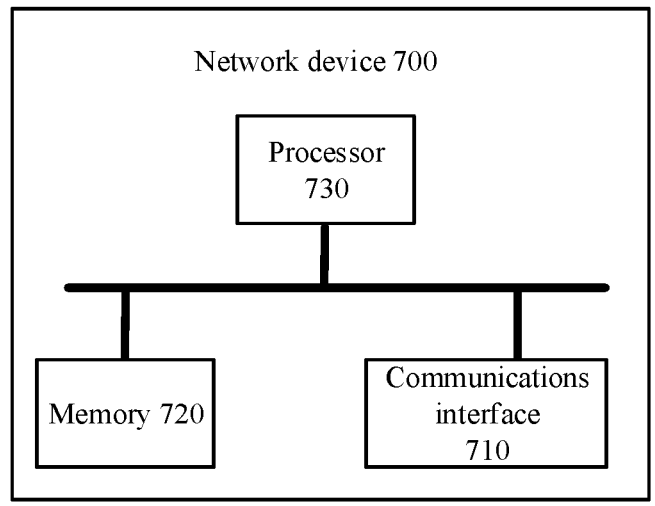
FIG. 7 is a schematic block diagram of a network device according to another embodiment of this application.

FIG. 7 is a schematic block diagram of a network device 700 according to an embodiment of this application. It should be understood that the network device 700 can perform steps performed by the network device in the methods in FIG. 1 to FIG. 4. To avoid repetition, details are not described herein again. The network device may include various types of base stations, such as a gNB, an NR base station, a macro base station, and a micro base station. The network device 700 includes:

a communications interface 710;

a memory 720, configured to store an instruction; and a processor 730, separately connected to the memory 720 and the communications interface 710, and configured to execute the instruction stored in the memory 720, to perform the following steps when executing the instruction: determining a plurality of pieces of quasi co-location information, where the plurality of pieces of quasi co-location information correspond to a plurality of antenna port sets of a first control resource set, and each piece of quasi co-location information in the plurality of pieces of quasi co-location information is used to indicate a quasi co-location characteristic of an antenna port set corresponding to each piece of quasi co-location information; and sending the plurality of pieces of quasi co-location information to a terminal device by using the communications interface 710.

It should be understood that the apparatus shown in FIG. 7 may be a RAN device, or may be a chip or a circuit, for example, a chip or a circuit that can be disposed in a network device. The network device 700 corresponds to the network device, the transmission/reception point, or the base station in FIG. 1 to FIG. 4. Further, the communications interface 710 may be exchanged for a transceiver. The transceiver includes a receiver and a transmitter. Still further, the network device 700 may further include a bus system.

The processor 730, the memory 720, the receiver, and the transmitter are connected by using the bus system. The processor 730 is configured to: execute the instruction stored in the memory 720 to control the receiver to receive a signal and control the transmitter to send a signal, and complete steps of the network device in the communication method in this application. The receiver and the transmitter may be a same physical entity or different physical entities. When the receiver and the transmitter are the same physical entity, the receiver and the transmitter may be collectively referred to as the transceiver. The memory 720 may be integrated into the processor 730, or may be separated from the processor 730.

In an implementation, it may be considered that functions of the receiver and the transmitter are implemented by using a transceiver circuit or a dedicated transceiver chip. It may be considered that the processor 730 is implemented by using a dedicated processing chip, a processing circuit, a processor, or a general-purpose chip.

In another implementation, it may be considered that the network device provided in this embodiment of this application is implemented by using a general-purpose computer. To be specific, program code for implementing functions of the processor 730, the receiver, and the transmitter are stored in the memory, and the general-purpose processor implements the functions of the processor 730, the receiver, and the transmitter by executing the code in the memory.

For a concept, explanation, detailed description, and other steps that are related to the network device 700 in FIG. 7 and related to the technical solutions provided in this embodiment of this application, refer to description about the content in the foregoing method or in another embodiment. Details are not described herein again.

Figure 8:
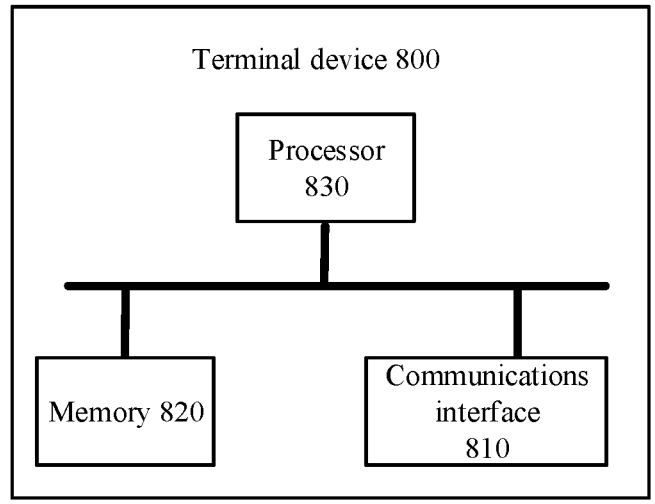
FIG. 8 is a schematic block diagram of a terminal device according to another embodiment of this application.

FIG. 8 is a schematic block diagram of a terminal device 800 according to an embodiment of this application. It should be understood that the terminal device 800 can perform steps performed by the terminal device in the methods in FIG. 1 to FIG. 4. To avoid repetition, details are not described herein again. The terminal device 800 includes:

a communications interface 810;

a memory 820, configured to store an instruction; and a processor 830, separately connected to the memory 820 and the communications interface 810, and configured to execute the instruction stored in the memory 820, to perform the following steps when executing the instruction: receiving a plurality of pieces of quasi co-location information from a network device by using the communications interface 810, where the plurality of pieces of quasi co-location information correspond to a plurality of antenna port sets of a first control resource set, and each piece of quasi co-location information in the plurality of pieces of quasi co-location information is used to indicate a quasi co-location characteristic of an antenna port set corresponding to each piece of quasi co-location information; and performing communication based on the plurality of pieces of quasi co-location information.

It should be understood that the apparatus shown in FIG. 8 may be a terminal device, or may be a chip or a circuit, for example, a chip or a circuit that can be disposed in a terminal device. The terminal device 800 corresponds to the terminal device in FIG. 1 to FIG. 4. Further, the communications interface 810 may be exchanged for a transceiver. The transceiver includes a receiver and a transmitter. Still further, the terminal device 800 may further include a bus system.

The processor 830, the memory 820, the receiver, and the transmitter are connected by using the bus system. The processor 830 is configured to: execute the instruction stored in the memory 820 to control the receiver to receive a signal and control the transmitter to send a signal, and complete steps of the terminal device in the communication method in this application. The receiver and the transmitter may be a same physical entity or different physical entities. When the receiver and the transmitter are the same physical entity, the receiver and the transmitter may be collectively referred to as the transceiver. The memory 820 may be integrated into the processor 830, or may be separated from the processor 830.

In an implementation, it may be considered that functions of the receiver and the transmitter are implemented by using a transceiver circuit or a dedicated transceiver chip. It may be considered that the processor 830 is implemented by using a dedicated processing chip, a processing circuit, a processor, or a general-purpose chip.

In another implementation, it may be considered that the terminal device provided in this embodiment of this application is implemented by using a general-purpose computer. To be specific, program code for implementing functions of the processor 830, the receiver, and the transmitter are stored in the memory, and the general-purpose processor implements the functions of the processor 830, the receiver, and the transmitter by executing the code in the memory.

For a concept, explanation, detailed description, and other steps that are related to the terminal device 800 in FIG. 8 and related to the technical solutions provided in this embodiment of this application, refer to description about the content in the foregoing method or in another embodiment. Details are not described herein again.

Figure 9:
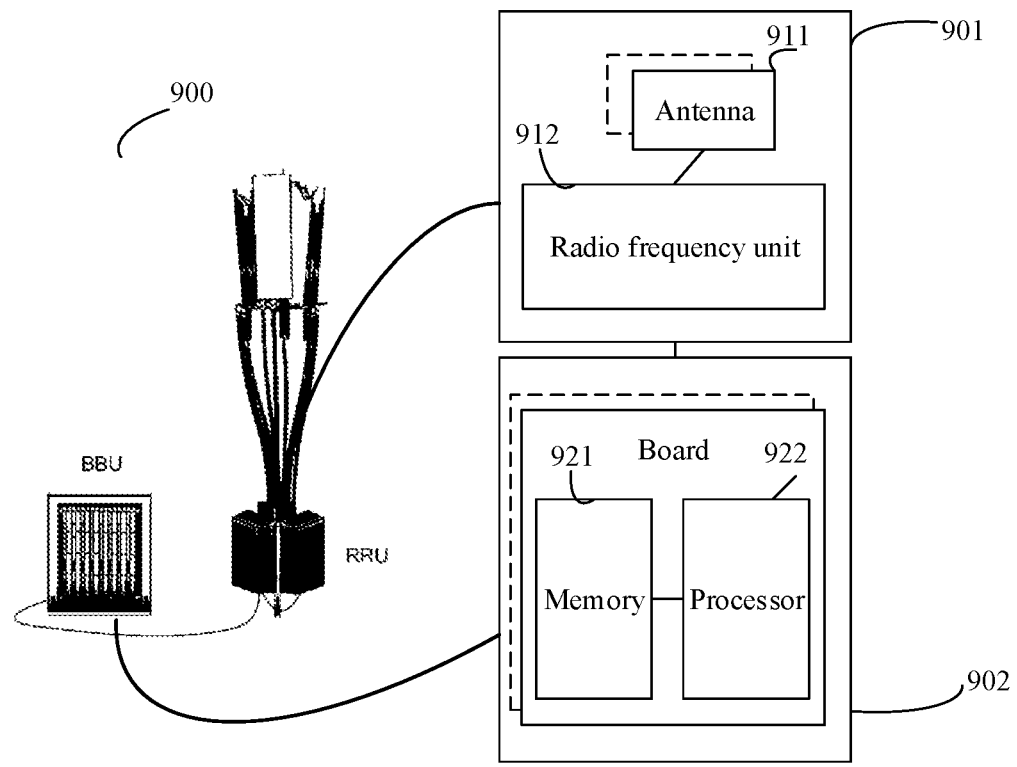
FIG. 9 is a schematic block diagram of a network device according to another embodiment of this application.

FIG. 9 is a schematic structural diagram of a network device 900 according to an embodiment of this application. For example, FIG. 9 may be a schematic structural diagram of a base station. As shown in FIG. 9, the network device 900 may be applied to the application environment described in FIG. 1 or another part of the embodiments of this application. The network device may include one or more radio frequency units, such as a remote radio unit (RRU) 901 and one or more baseband units (BBU) (also referred to as a digital unit, (DU)) 902. The RRU 2901 may be referred to as a transceiver unit, a transceiver, a transceiver circuit, a transceiver, or the like. The RRU 901 may include at least one antenna 911 and a radio frequency unit 912. The RRU 901 is mainly configured to transmit and receive a radio frequency signal and perform conversion between a radio frequency signal and a baseband signal. For example, the RRU 901 is configured to send a signaling message in the foregoing embodiment to a terminal device. The BBU 902 is mainly configured to perform baseband processing and control the base station. The RRU 901 and the BBU 902 may be physically disposed together, or may be physically separated, in other words, in a distributed base station.

The BBU 902 is a control center of the base station, or may be referred to as a processing unit. The BBU 902 is mainly configured to complete baseband processing functions such as channel coding, multiplexing, modulation, and spectrum spreading. For example, the BBU (the processing unit) may be configured to control the base station to execute an operation procedure of the network device in the foregoing method embodiment.

In an example, the BBU 902 may include one or more boards, and a plurality of boards may jointly support a radio access network (such as an LTE network) in a single access standard, or may separately support radio access networks in different access standards. The BBU 902 further includes a memory 921 and a processor 922. The memory 921 is configured to store a necessary instruction and data. For example, the memory 921 stores preset information, a codebook, and the like in the foregoing embodiment. The processor 922 is configured to control the base station to perform necessary operations. For example, the processor 922 is configured to control the base station to execute an operation procedure of the network device in the foregoing method embodiment. The memory 921 and the processor 922 may serve one or more boards. In other words, a memory and a processor may be separately disposed on each board. Alternatively, a plurality of boards may share a same memory and a same processor. In addition, a necessary circuit may be further disposed on each board.

Figure 10:
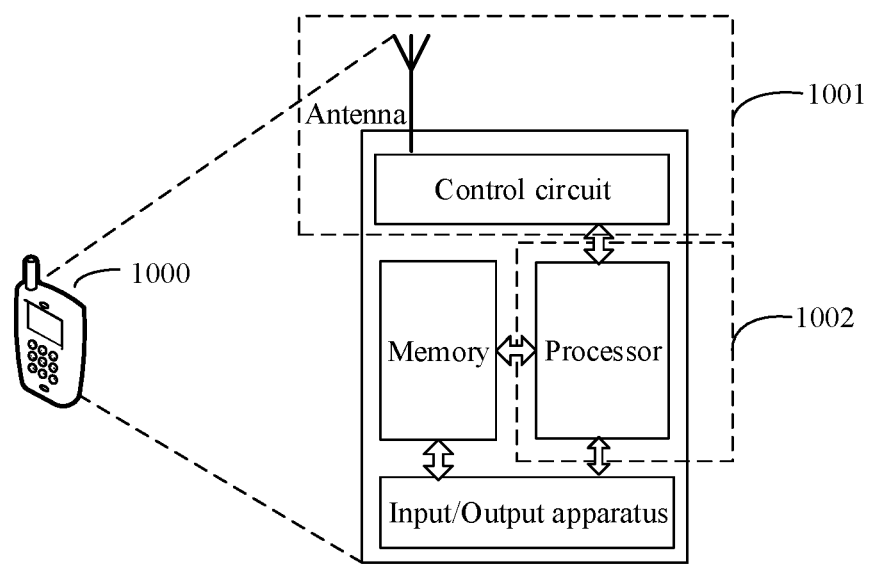
FIG. 10 is a schematic block diagram of a terminal device according to another embodiment of this application.

FIG. 10 is a schematic structural diagram of a terminal device 1000 according to an embodiment of this application. The terminal device 1000 may be applied to the application environment described in FIG. 1 or another part of this embodiment of this application. For ease of description, FIG. 10 shows only main components of the terminal device 1000. As shown in FIG. 10, the terminal device 1000 includes a processor, a memory, a control circuit, an antenna, and an input/output apparatus. The processor is mainly configured to: process a communication protocol and communication data, control the entire terminal device, execute a software program, and process data of the software program. For example, the processor is configured to support the terminal device 1000 in performing operations of the terminal device described in the communication method 200. The memory is mainly configured to store the software program and data, for example, store data used in the foregoing communication process. The control circuit is mainly configured to perform conversion between a baseband signal and a radio frequency signal and process a radio frequency signal. The control circuit together with the antenna may also be referred to as a transceiver that is mainly configured to receive and transmit a radio frequency signal in an electromagnetic wave form. The input/output apparatus such as a touchscreen, a display, or a keyboard is mainly configured to: receive data entered by a user and output data to the user.

After the terminal device 1000 is powered on, the processor may read a software program in a storage unit, explain and execute data of the software program. When data needs to be sent by using an antenna, the processor performs baseband processing on the to-be-sent data, and outputs a baseband signal to a radio frequency circuit. After the radio frequency circuit performs radio frequency processing on the baseband signal, a radio frequency signal is sent in an electromagnetic wave form by using the antenna. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 7 shows only one memory and processor. Actually, the terminal device may include a plurality of processors and a plurality of memories. The memory may also be referred to as a storage medium, a storage device, or the like. This is not limited in this embodiment of the present disclosure.

In an optional implementation, the processor may include a baseband processor and a central processing unit. The baseband processor is mainly configured to process a communication protocol and communication data, and the central processing unit is mainly configured to: control the entire terminal device, execute a software program, and process data of the software program. Functions of the baseband processor and the central processing unit are integrated into the processor in FIG. 10. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built into the processor, or may be stored in the storage unit in a form of a software program, so that the processor executes the software program to implement a baseband processing function.

For example, in this embodiment of the present disclosure, the antenna and the control circuit that have receiving and sending functions may be considered as a transceiver unit 1001 of the terminal device 1000, and the processor having a processing function may be considered as a processing unit 1002 of the terminal device 1000. As shown in FIG. 10, the terminal device 1000 includes the transceiver unit 1001 and the processing unit 1002. The transceiver unit 1001 may also be referred to as a transceiver, a transceiver, a transceiver apparatus, or the like. Optionally, a component that is in the transceiver unit 1001 and is configured to implement a receiving function may be considered as a receiving unit, and a component that is in the transceiver unit 1001 and is configured to implement a sending function may be considered as a sending unit, namely, the transceiver unit 1001 includes the receiving unit and the sending unit. For example, the receiving unit may also be referred to as a receiver, a receiver, a receiver circuit, or the like, and the sending unit may be referred to as a transmitter, a transmitter, a transmit circuit, or the like.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on an actual need to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a network device, pieces of quasi co-location information, wherein the pieces of quasi co-location information correspond to antenna port sets of a first control resource set, and each piece of quasi co-location information in the pieces of quasi co-location information is used to indicate a quasi co-location characteristic of an antenna port set corresponding to each piece of quasi co-location information; and
   sending, by the network device, the pieces of quasi co-location information to a terminal device.

2. The communication method according to claim 1, wherein the quasi co-location information indicates quasi co-location characteristics of the antenna port sets by using a pilot signal identifier or a pilot signal group identifier.

3. The communication method according to claim 1, wherein quasi co-location information indicates quasi co-location characteristics of the antenna port sets by using a channel state information-reference signal (CSI-RS) resource identifier.

4. The communication method according to claim 1, wherein the first control resource set comprises resource sets, and the resource sets respectively correspond to the antenna port sets.

5. A communication method, comprising:
   receiving, by a terminal device, pieces of quasi co-location information from a network device, wherein the pieces of quasi co-location information correspond to antenna port sets of a first control resource set, and each piece of quasi co-location information in the pieces of quasi co-location information is used to indicate a quasi co-location characteristic of an antenna port set corresponding to each piece of quasi co-location information; and
   performing, by the terminal device, communication based on the pieces of quasi co-location information.

6. The communication method according to claim 5, wherein the quasi co-location information indicates quasi co-location characteristics of the antenna port sets by using a pilot signal identifier or a pilot signal group identifier.

7. The communication method according to claim 5, wherein quasi co-location information indicates quasi co-location characteristics of the antenna port sets by using a channel state information-reference signal (CSI-RS) resource identifier.

8. The communication method according to claim 5, wherein the first control resource set comprises resource sets, and the resource sets respectively correspond to the antenna port sets.

9. The communication method according to claim 8, wherein the resource sets are allocated according to at least one of the following granularities: a control channel element (CCE), a physical control channel candidate, and a resource element group (REG).

10. The communication method according to claim 8, further comprising: receiving, by the terminal device, resource allocation indication information from the network device, wherein the resource allocation indication information is used to indicate allocation rule information of the resource sets comprised in the first control resource.

11. The communication method according to claim 5, further comprising:
receiving, by the terminal device, resource element mapping indication information from the network device, wherein the resource element mapping indication information is used to indicate a location of a resource element of control information corresponding to a first antenna port set in the first control resource set, and the first antenna port set is any one of the antenna port sets.

12. The communication method according to claim 11, wherein the resource mapping indication information comprises information indicating a location of a pilot signal in the first control resource set.

13. A terminal device, comprising:
a processor; and
a memory storing instructions that when executed by the processor configure the processor to perform steps comprising:
receiving pieces of quasi co-location information from a network device, wherein the pieces of quasi co-location information correspond to antenna port sets of a first control resource set, and each piece of quasi co-location information in the pieces of quasi co-location information is used to indicate a quasi co-location characteristic of an antenna port set corresponding to each piece of quasi co-location information; and
performing communication based on the pieces of quasi co-location information.

14. The terminal device according to claim 13, wherein the quasi co-location information indicates quasi co-location characteristics of the antenna port sets by using a pilot signal identifier or a pilot signal group identifier.

15. The terminal device according to claim 13, wherein quasi co-location information indicates quasi co-location characteristics of the antenna port sets by using a channel state information-reference signal (CSI-RS) resource identifier.

16. The terminal device according to claim 13, wherein the first control resource set comprises resource sets, and the resource sets respectively correspond to the antenna port sets.

17. The terminal device according to claim 16, wherein the resource sets are allocated according to at least one of the following granularities: a control channel element (CCE), a physical control channel candidate, and a resource element group (REG).

18. The terminal device according to claim 16, wherein the memory further stores instructions that when executed by the processor configure the processor to perform steps further comprising receiving resource allocation indication information from the network device, wherein the resource allocation indication information is used to indicate allocation rule information of the resource sets comprised in the first control resource.

19. The terminal device according to claim 13, wherein the memory further stores instructions that when executed by the processor configure the processor to perform steps further comprising receiving resource element mapping indication information from the network device, wherein the resource element mapping indication information is used to indicate a location of a resource element of control information corresponding to a first antenna port set in the first control resource set, and the first antenna port set is any one of the antenna port sets.

20. The terminal device according to claim 19, wherein the resource mapping indication information comprises information indicating a location of a pilot signal in the first control resource set.

\* \* \* \* \*